US012712312B2

(12) United States Patent
Chen et al.

(10) Patent No.: US 12,712,312 B2
(45) Date of Patent: Aug. 18, 2026

(54) MULTI-PIECE ELECTRICAL CONNECTOR

(71) Applicants: Tarng Yu Enterprise co., ltd., New Taipei City (TW); Dongguan Tarng Yu Electronics Co., Ltd., Dongguan City (CN)

(72) Inventors: Ying-Chung Chen, New Taipei City (TW); Mu-Jung Huang, New Taipei City (TW)

(73) Assignees: TARNG YU ENTERPRISE CO., LTD., Dongguan City (CN); DONGGUAN TARNG YU ELECTRONICS CO., LTD., Dongguan City (CN)

( * ) Notice: Subject to any disclaimer, the term of this patent is extended or adjusted under 35 U.S.C. 154(b) by 0 days.

(21) Appl. No.: 19/387,007

(22) Filed: Nov. 12, 2025

(65) Prior Publication Data

US 2026/0135322 A1 May 14, 2026

(30) Foreign Application Priority Data

Nov. 13, 2024 (TW) ................................ 113143669

(51) Int. Cl.
*H01R 13/502* (2006.01)
*H01R 13/40* (2006.01)

(52) U.S. Cl.
CPC ........... *H01R 13/502* (2013.01); *H01R 13/40* (2013.01)

(58) Field of Classification Search
CPC .... H01R 13/502; H01R 13/40; H01R 13/518; H01R 13/659
See application file for complete search history.

(56) References Cited

U.S. PATENT DOCUMENTS

| | | | | | |
|---|---|---|---|---|---|
| 5,344,347 | A * | 9/1994 | Inoue | H01R 13/6271 | 439/924.1 |
| 5,913,703 | A * | 6/1999 | Suzuki | H01R 13/641 | 439/701 |
| 6,264,501 | B1 * | 7/2001 | Hung | H01R 13/502 | 439/541.5 |
| 7,114,998 | B2 * | 10/2006 | Ishikawa | H01R 13/516 | 439/752 |
| 12,126,108 | B2 * | 10/2024 | Nozaki | H01R 13/424 | |
| 2009/0042445 | A1 * | 2/2009 | Ichio | H01R 13/4361 | 324/538 |

* cited by examiner

*Primary Examiner* — Travis S Chambers
(74) *Attorney, Agent, or Firm* — LANWAY IPR SERVICES; Chun-Ming Shih

(57) ABSTRACT

A multi-piece electrical connector configured to be installed in an electronic device to transmit signals, is formed by a combination of multiple electrical connector subcomponents. Therefore, even after the design of the multi-piece electrical connector is completed, customized adjustment of the engaging structure and the number of conductive terminals can still be achieved by adjusting the combination of the multiple electrical connector subcomponents, allowing the multi-piece electrical connector to be applicable to various electronic devices.

11 Claims, 12 Drawing Sheets

A'-A'

A-A

B-B

MULTI-PIECE ELECTRICAL CONNECTOR

CROSS-REFERENCE TO RELATED APPLICATIONS

This application claims the priority of Republic of China Patent Application No. 113143669 filed on Nov. 13, 2024, in the State Intellectual Property Office of the R.O.C., the disclosure of which is incorporated herein by reference.

BACKGROUND OF THE INVENTION

Field of the Invention

The present application relates to the technical field of electronic devices, and more particularly, to a multi-piece electrical connector that allows customized adjustment of its engaging port features and the number of its conductive terminals.

Descriptions of the Related Art

In various currently available electronic devices, electrical connectors that provide engagement with other components are typically installed to transmit signals. In response to the specific requirements and developments of electronic devices, it is often expected that the engaging port features and the number of conductive terminals of the electrical connectors can be customized and adjusted to meet different signal transmission demands for those electronic devices. Nevertheless, the current technology is not yet able to provide such flexibility. Once the design of an electrical connector is completed, its engaging structure and the number of its conductive terminals become fixed and are not adjustable. This results in the electrical connector being unsuitable for various types of electronic devices.

In view of the foregoing, how to achieve customized adjustment of engaging port features and the number of conductive terminals of an electrical connector has now become a technical issue that the industry is eager to challenge and overcome.

SUMMARY OF THE INVENTION

In view of the drawbacks of the prior art mentioned above, the present application provides a multi-piece electrical connector, comprising: a major electrical connector subcomponent comprising a major insulation core, the major insulation core comprising a major insulation core engaging port, the major insulation core engaging port comprising a major insulation core engaging port feature; and a minor electrical connector subcomponent comprising a minor insulation core, the minor insulation core comprising a minor insulation core engaging port, the minor insulation core engaging port comprising a minor insulation core engaging port feature; wherein the minor electrical connector subcomponent is configured to be combined with the major electrical connector subcomponent, allowing the minor insulation core engaging port and the major insulation core engaging port to be engaged with each other, wherein the major insulation core engaging port feature and the minor insulation core engaging port feature are substantially identical or substantially different.

Preferably, the multi-piece electrical connector said above, wherein the major electrical connector subcomponent further comprises a major conductive terminal inserted into the major insulation core engaging port, and the minor insulation core further comprises a minor insulation core combination body and a minor insulation core terminal positioning structure, the minor insulation core combination body comprising a minor insulation core combination body engaging side and a minor insulation core combination body positioning side, wherein the minor insulation core engaging port is located at the minor insulation core combination body engaging side, and the minor insulation core terminal positioning structure is located at the minor insulation core combination body positioning side to position the major conductive terminal, so as to prevent the major conductive terminal from being disengaged from the major insulation core engaging port.

Preferably, the multi-piece electrical connector said above, wherein the minor insulation core terminal positioning structure is an abutting structure configured to abut the major conductive terminal.

Preferably, the multi-piece electrical connector said above, wherein the major insulation core further comprises a major insulation core terminal positioning structure configured to position the major conductive terminal, so as to prevent the major conductive terminal from being disengaged from the major insulation core engaging port.

Preferably, the multi-piece electrical connector said above, wherein the major insulation core terminal positioning structure is an elastic abutting structure configured to elastically abut the major conductive terminal.

Preferably, the multi-piece electrical connector said above, wherein the minor insulation core engaging port is a hollow cylindrical structure comprising a minor insulation core engaging port terminal receiving space; the minor electrical connector subcomponent further comprises a minor conductive terminal configured to be inserted into the minor insulation core engaging port and received in the minor insulation core engaging port terminal receiving space.

Preferably, the multi-piece electrical connector said above, wherein the major conductive terminal and the minor conductive terminal are signal terminals or power terminals.

Preferably, the multi-piece electrical connector said above, which is configured to be combined with a major conductive cable to form a cable-end connector, wherein the minor insulation core further comprises a minor insulation core cable passage structure configured to guide the major conductive cable into the major insulation core to electrically engage the major conductive terminal, and the minor insulation core cable passage structure is disposed apart from the minor insulation core terminal positioning structure.

Preferably, the multi-piece electrical connector said above, wherein the minor insulation core further comprises a minor insulation core mating structure configured to be mated with the major insulation core to maintain the combination relationship between the minor electrical connector subcomponent and the major electrical connector subcomponent.

Preferably, the multi-piece electrical connector said above, wherein the major insulation core engaging port feature and the minor insulation core engaging port feature are color features or structural features.

Preferably, the multi-piece electrical connector said above, wherein the minor insulation core engaging port comprises a minor insulation core engaging port foolproof structure configured to provide foolproof engagement.

Preferably, the multi-piece electrical connector said above, wherein the minor insulation core engaging port foolproof structure is a chamfered structure.

Compared with the prior art, the present application provides a multi-piece electrical connector configured to be installed in an electronic device to transmit signals. The multi-piece electrical connector is formed by a combination of multiple electrical connector subcomponents, wherein the engaging port features and the number of conductive terminals of the electrical connector subcomponents may optionally be substantially different. Therefore, even after the design of the multi-piece electrical connector is completed, customized adjustment of the engaging structure and the number of conductive terminals can still be achieved by adjusting the combination of multiple electrical connector subcomponents, allowing the multi-piece electrical connector to be applicable to various electronic devices.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Embodiments of the present invention will now be described in detail with reference to the accompanying drawings. The invention may, however, be embodied in many different forms and should not be construed as being limited to the embodiments set forth herein. Rather, these embodiments are provided so that this disclosure will be thorough and complete, and will fully convey the scope of the invention to those skilled in the art.

The present application provides at least one multi-piece electrical connector, which can be installed in an electronic device to engage an engaging component and transmit signals. The multi-piece electrical connector is formed by a combination of multiple electrical connector subcomponents. Therefore, even after the design of the multi-piece electrical connector is completed, customized adjustment of the engaging structure and the number of conductive terminals can still be achieved by adjusting the combination of the multiple electrical connector subcomponents, allowing the multi-piece electrical connector to be applicable to various electronic devices.

Figure 1:
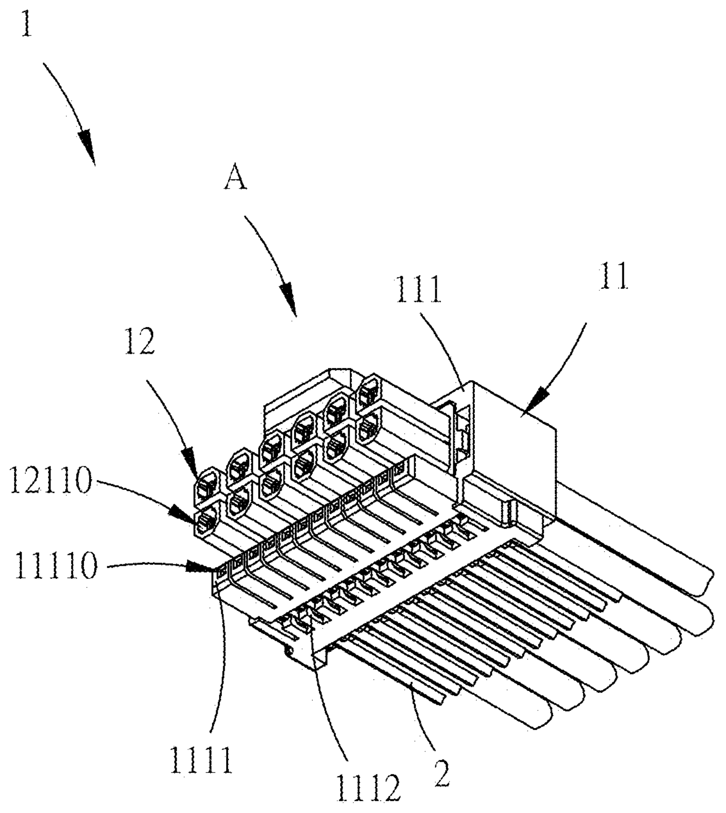
FIG. 1 is a perspective schematic view of the multi-piece electrical connector of the present application in one embodiment.
Figure 2:
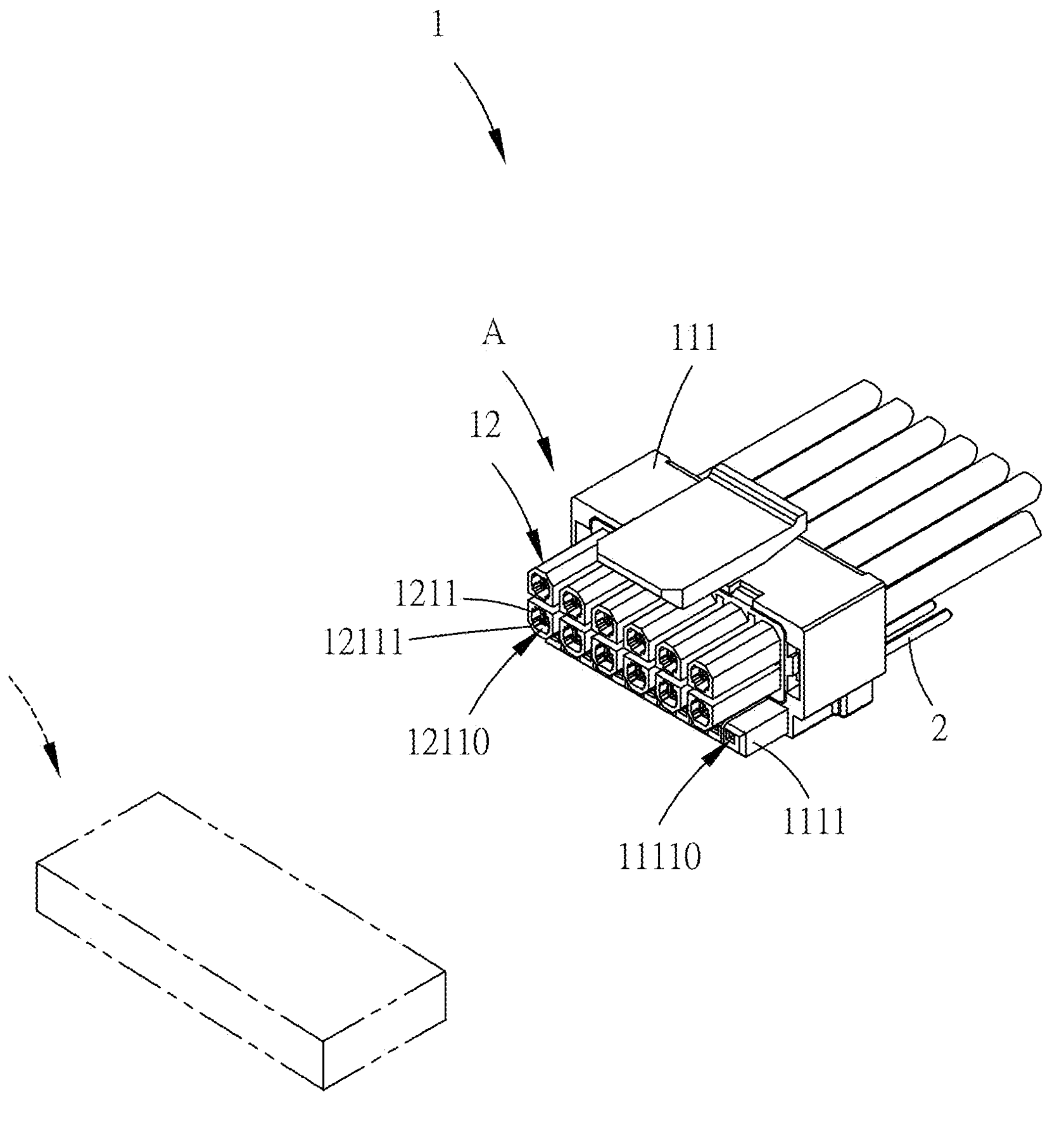
FIG. 2 is a perspective schematic view of the multi-piece electrical connector of the present application in one embodiment.
Figure 3:
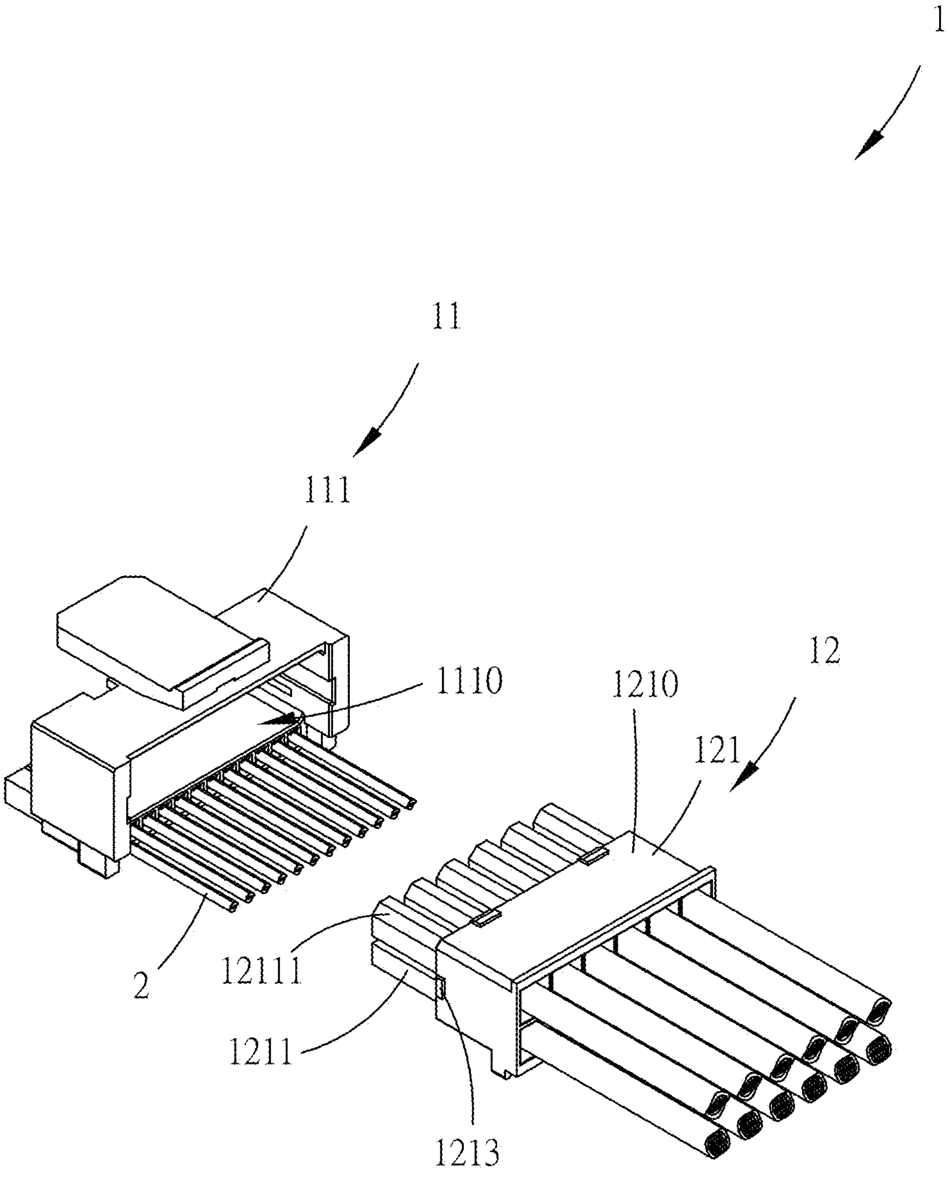
FIG. 3 is a perspective schematic view from a first viewing angle of the multi-piece electrical connector of the present application in one embodiment.
Figure 4:
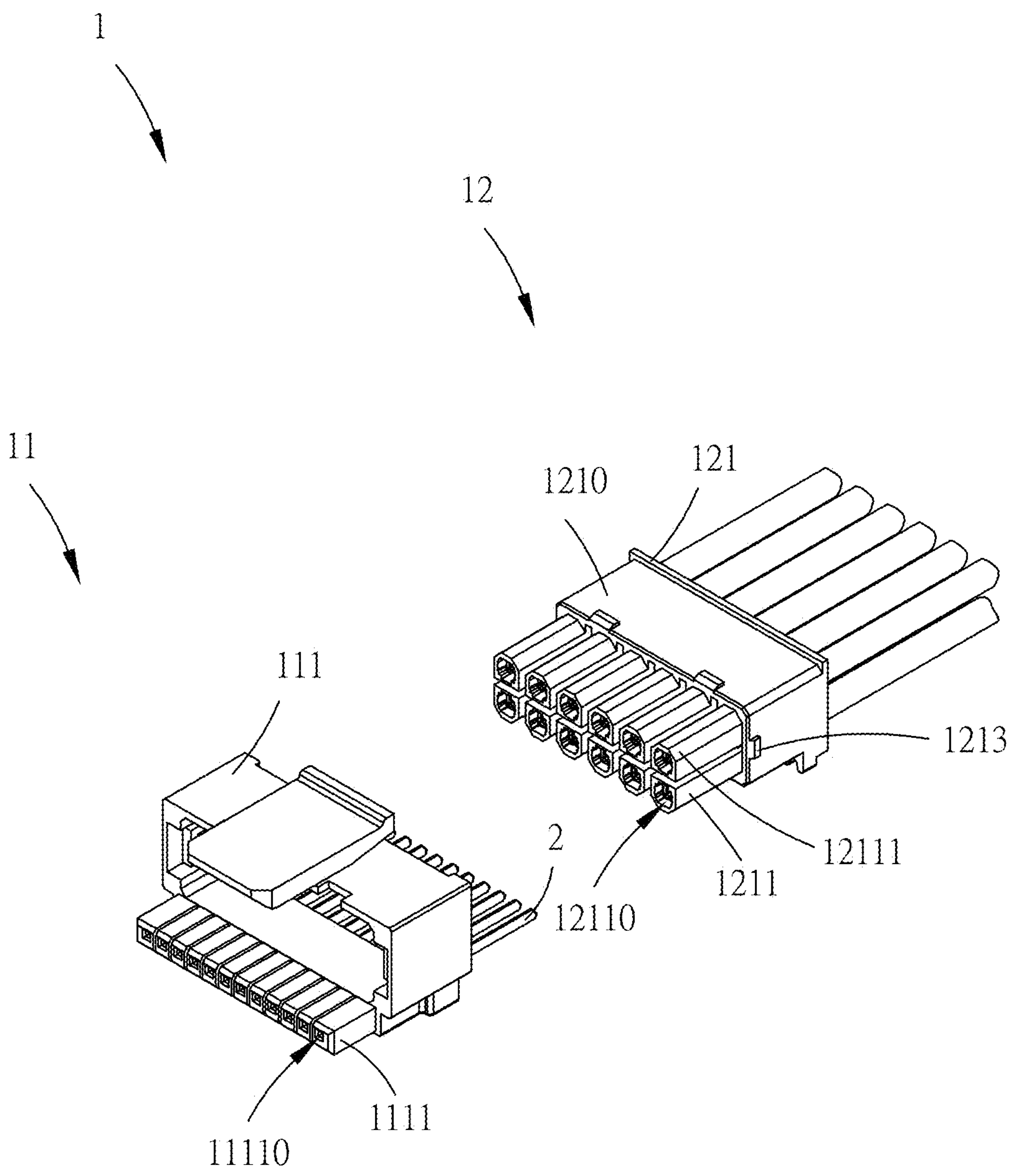
FIG. 4 is a perspective schematic view from a second viewing angle of the multi-piece electrical connector of the present application in one embodiment.
Figure 5:
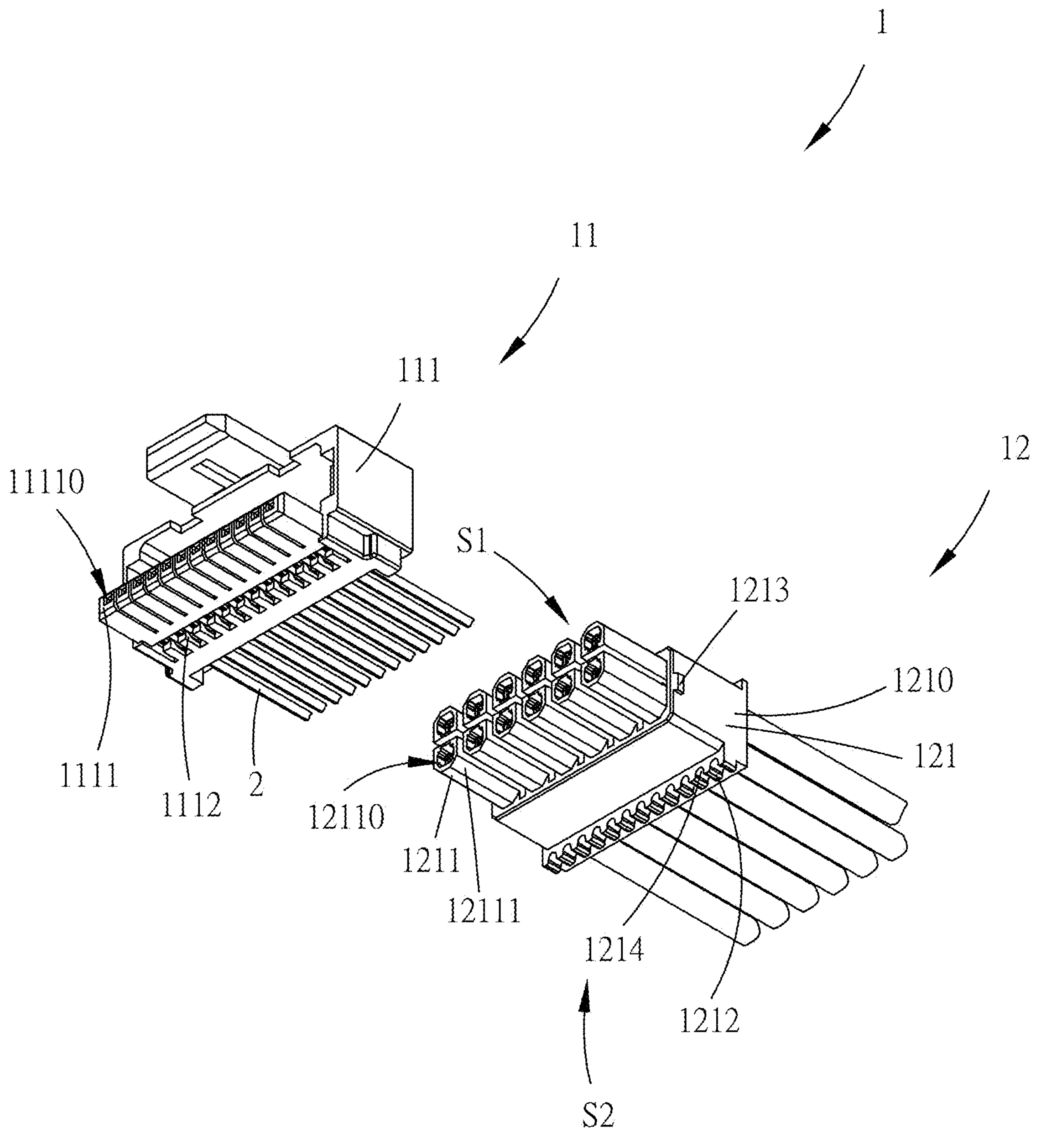
FIG. 5 is a perspective schematic view from a third viewing angle of the multi-piece electrical connector of the present application in one embodiment.
Figure 6:
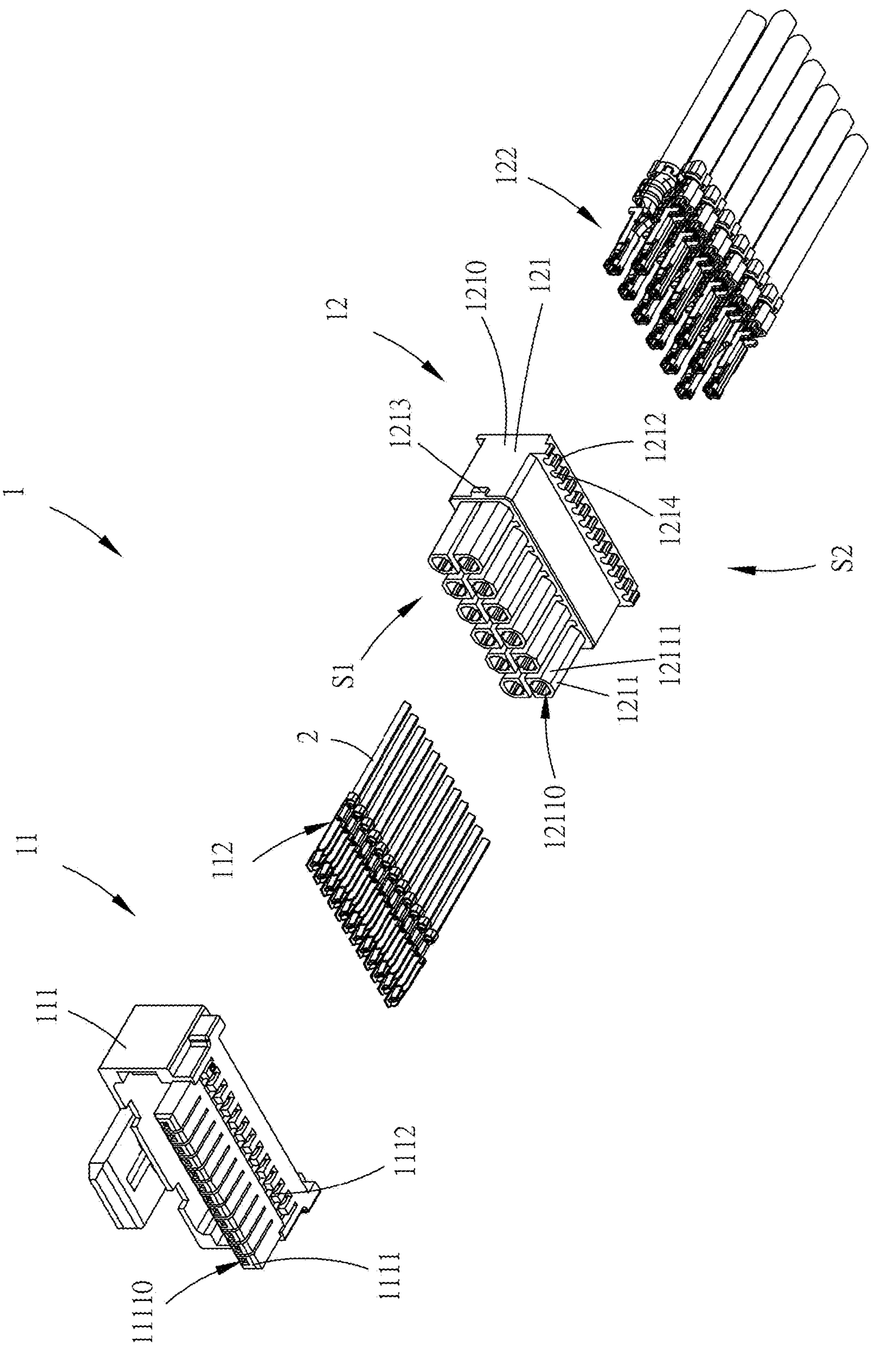
FIG. 6 is a perspective schematic view from a first viewing angle of the multi-piece electrical connector of the present application in one embodiment.
Figure 7:
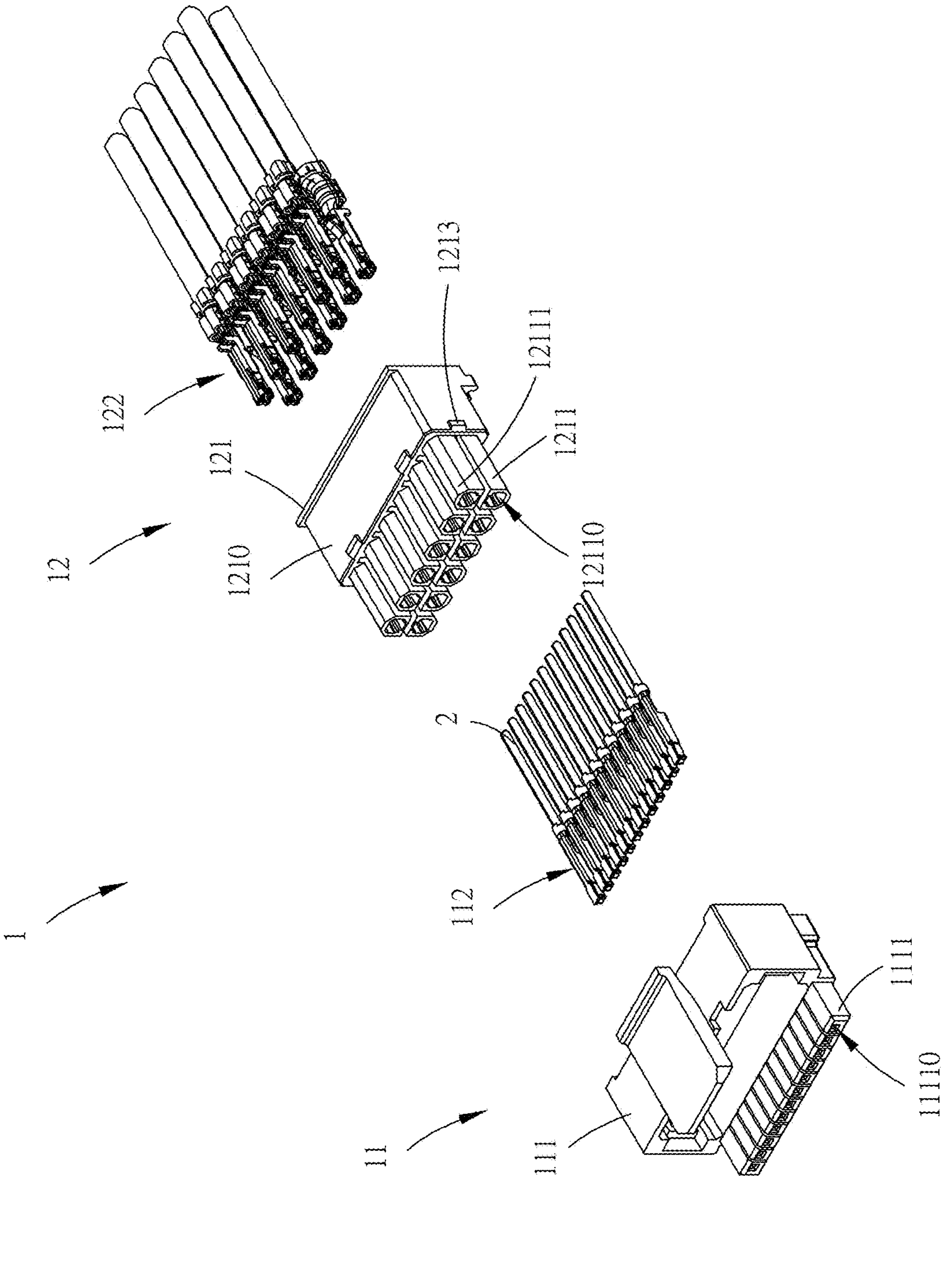
FIG. 7 is a perspective schematic view from a second viewing angle of the multi-piece electrical connector of the present application in one embodiment.
Figure 8:
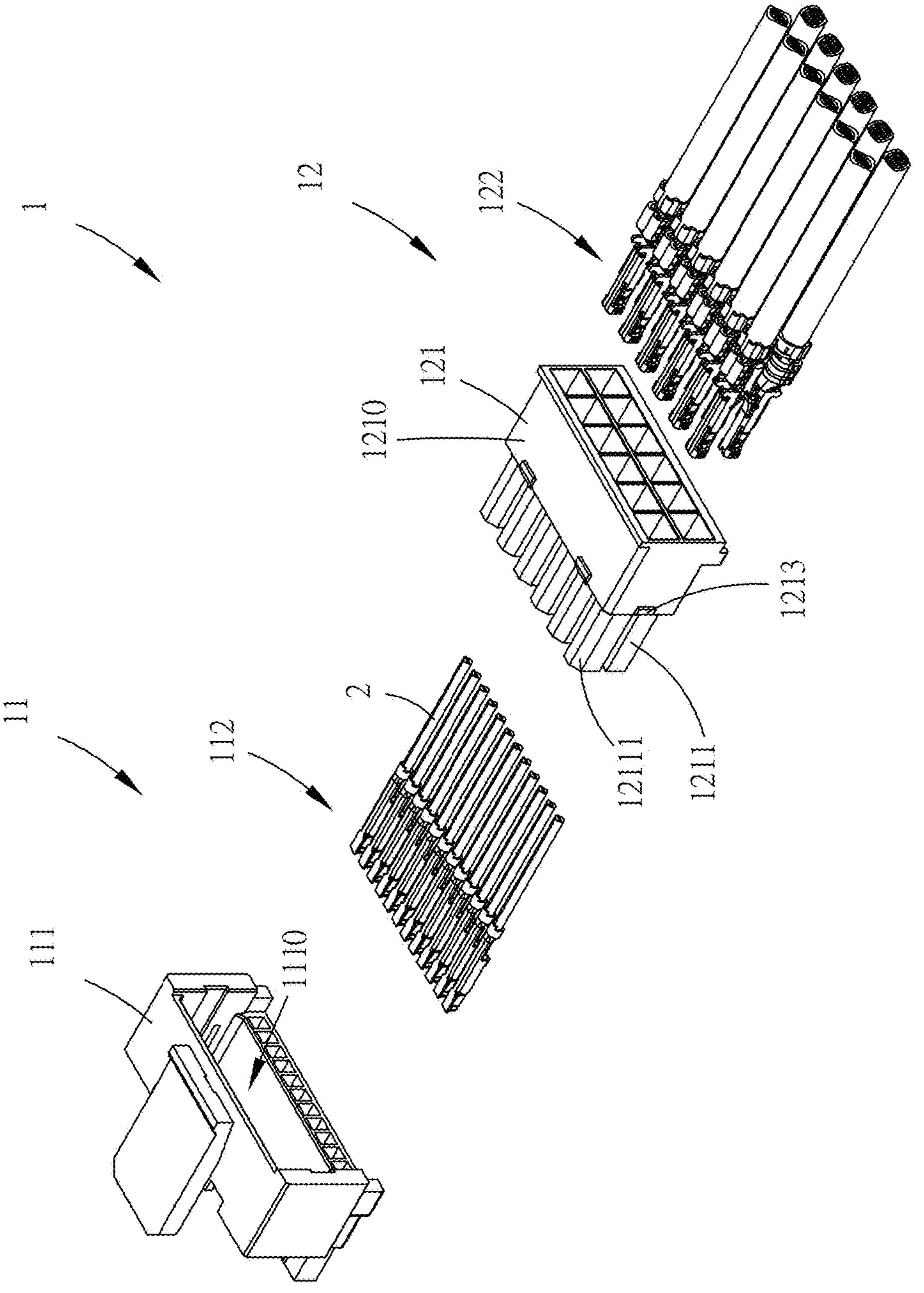
FIG. 8 is a perspective schematic view from a third viewing angle of the multi-piece electrical connector of the present application in one embodiment.
Figure 9:
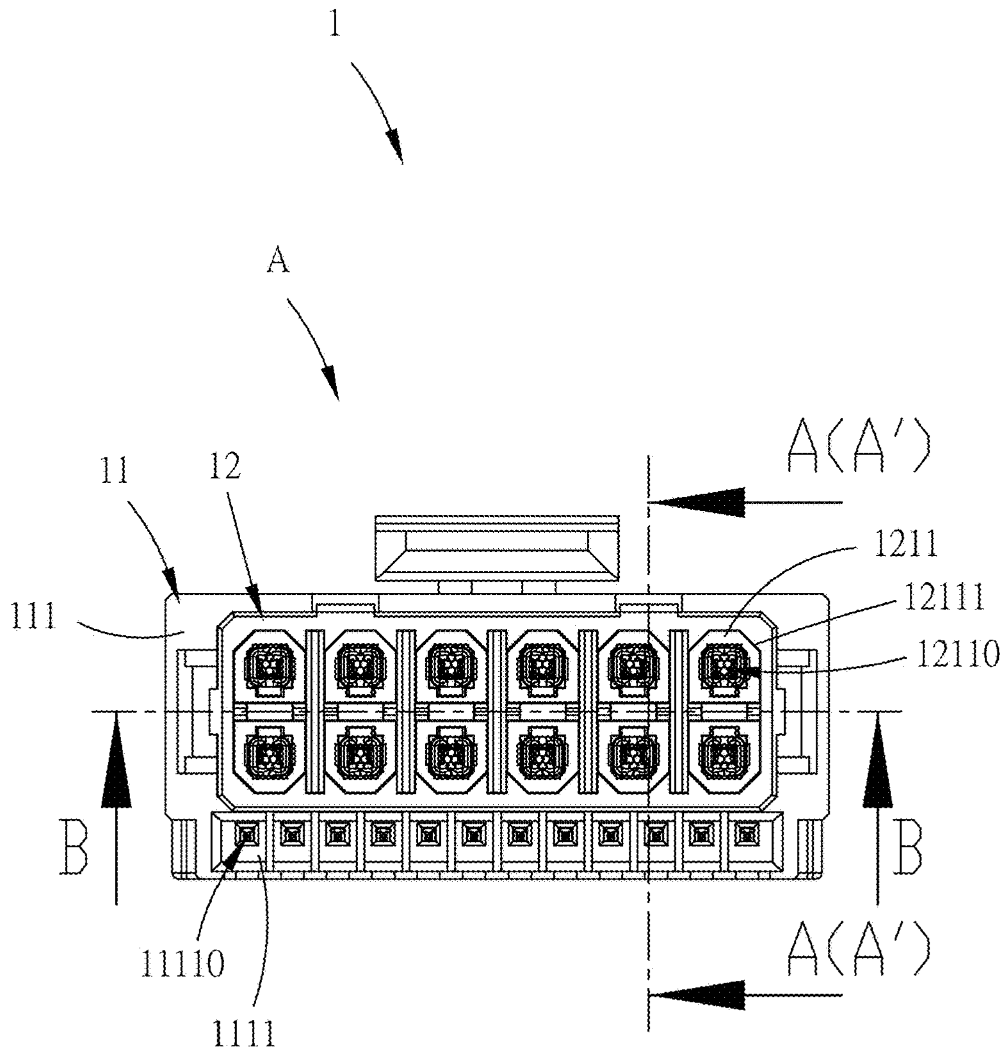
FIG. 9 is a front schematic view of the multi-piece electrical connector of the present application in one embodiment.
Figure 10:
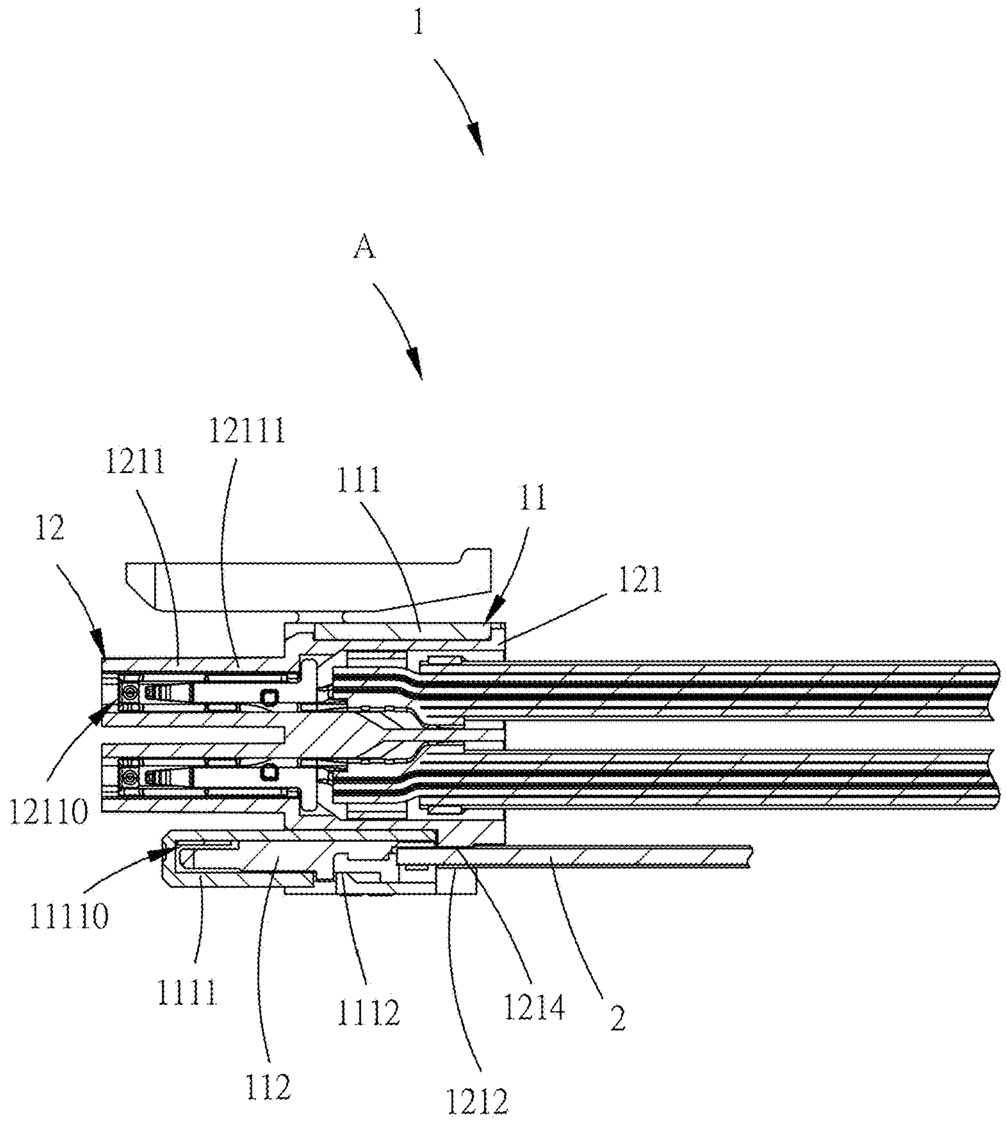
FIG. 10 is a cross-sectional schematic view taken along line AA of a portion of the multi-piece electrical connector shown in FIG. 9.
Figure 11:
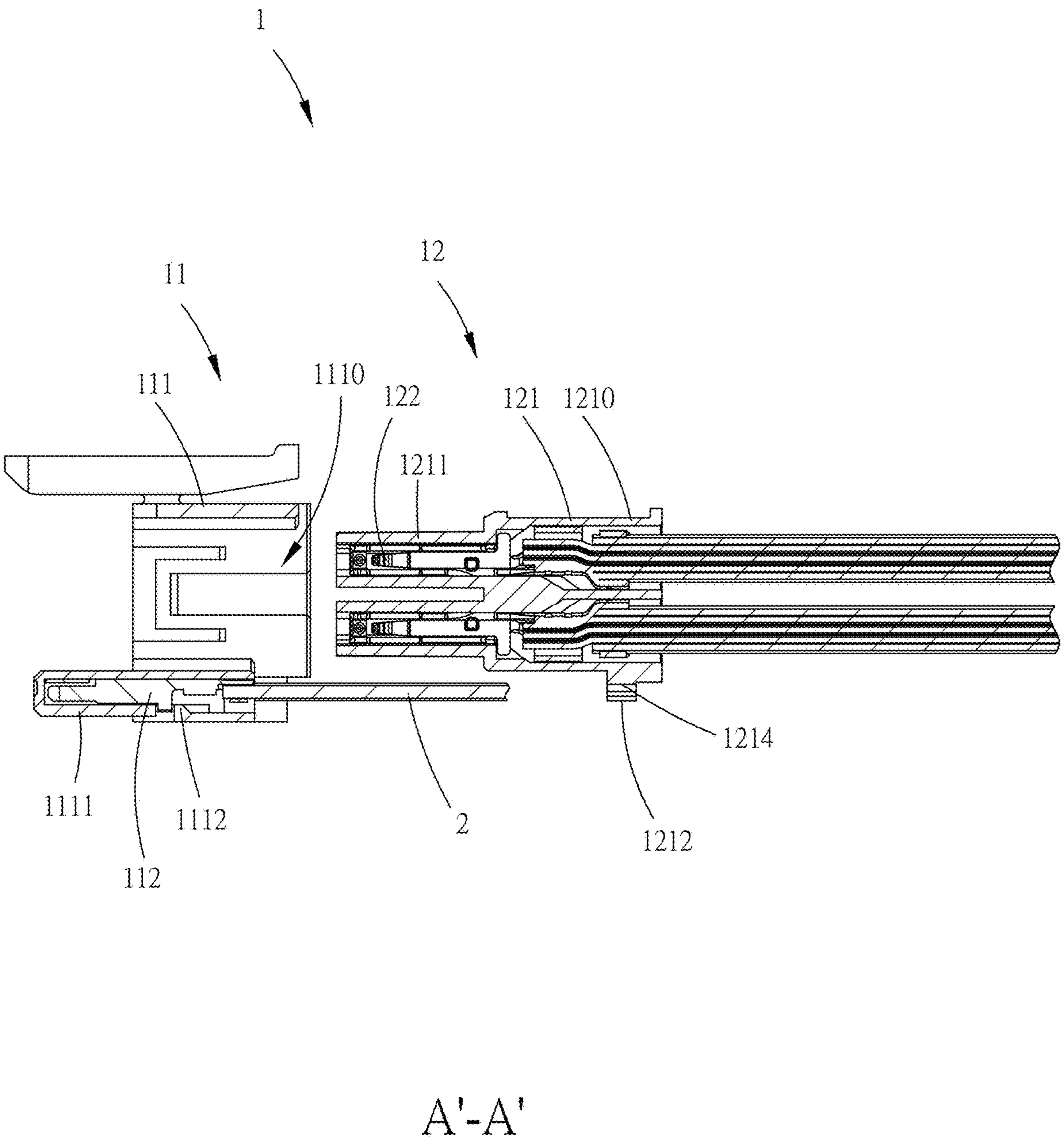
FIG. 11 is a cross-sectional schematic view taken along line A'A' of a portion of the multi-piece electrical connector shown in FIG. 9.
Figure 12:
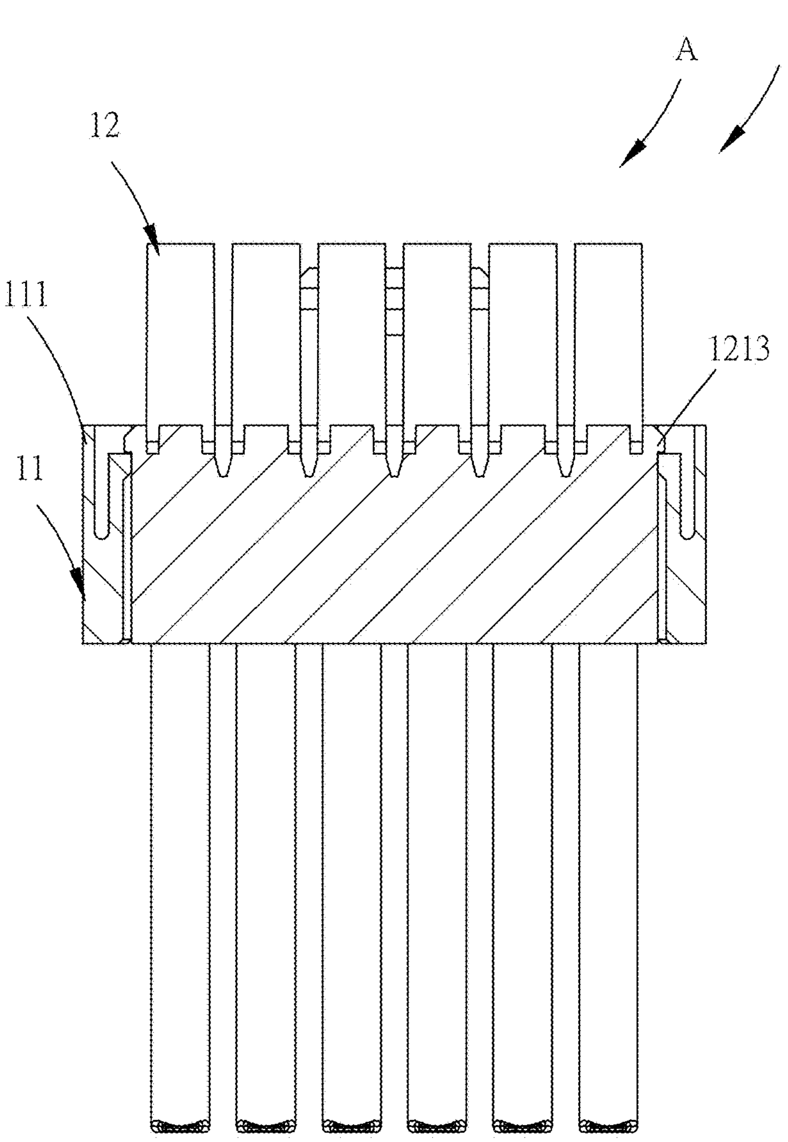
FIG. 12 is a cross-sectional schematic view taken along line BB of a portion of the multi-piece electrical connector shown in FIG. 9.

For a detailed description of the embodiments disclosed in the present application, please refer to FIGS. 1 to 12.

In the embodiment shown in FIGS. 1 through 12, a multi-piece electrical connector 1 is provided, which is capable of engaging an engaging component 3 to transmit signals. The multi-piece electrical connector 1 comprises at least one major electrical connector subcomponent 11 and at least one minor electrical connector subcomponent 12. It should be noted that the engaging component 3 is, but not limited to, a mating connector.

Regarding the major electrical connector subcomponent 11, it comprises at least one major insulation core 111 and at least one major conductive terminal 112. The major insulation core 111 comprises a major insulation core combination space 1110 and a major insulation core engaging port 1111. The major insulation core engaging port 1111 comprises a major insulation core engaging port terminal receiving space 11110 and a major insulation core engaging port feature. The major insulation core engaging port terminal receiving space 11110 penetrates the major insulation core engaging port 1111. Accordingly, the major conductive terminal 112 is inserted into the major insulation core engaging port 1111 and into the major insulation core engaging port terminal receiving space 11110 to engage the engaging component 3.

It should be noted that the major insulation core engaging port feature may optionally be a color feature to provide identification of the major insulation core engaging port 1111 when the multi-piece electrical connector 1 engages the engaging component 3, thereby determining whether the major insulation core engaging port 1111 has successfully engaged the engaging component 3. However, the present application is not limited thereto. The major insulation core engaging port feature may alternatively be a structural feature that allows the major insulation core engaging port 1111 to adapt to the structure of the engaging component 3 so that it can successfully engage the engaging component 3. In addition, the number of major conductive terminals 112 can be customized and adjusted, and the major conductive terminals 112 may be signal terminals or power terminals to meet the signal transmission requirements of various electronic devices engaged with the engaging component 3.

In the embodiment shown in FIGS. 1, 5 to 6, and 10 to 11, the major insulation core 111 further comprises a major insulation core terminal positioning structure 1112, which may, but is not limited to, be an elastic abutting structure configured to elastically abut the major conductive terminal 112. This allows the major insulation core terminal positioning structure 1112 to position the major conductive terminal 112 and prevent it from being disengaged from the major insulation core engaging port terminal receiving space 11110.

Regarding the minor electrical connector subcomponent 12, it comprises at least one minor insulation core 121 and at least one minor conductive terminal 122. The minor insulation core 121 can be mated with the major electrical connector subcomponent 11 and comprises a minor insulation core combination body 1210, at least one minor insulation core engaging port 1211, and at least one minor insulation core terminal positioning structure 1212. Two sides of the minor insulation core combination body 1210 are respectively a minor insulation core combination body engaging side S1 and a minor insulation core combination body positioning side S2. The minor insulation core engaging port 1211 is located at the minor insulation core combination body engaging side S1 and comprises a minor insulation core engaging port feature. The minor insulation core engaging port 1211 is a hollow cylindrical structure comprising a minor insulation core engaging port terminal receiving space 12110. The minor insulation core engaging port terminal receiving space 12110 penetrates the minor insulation core engaging port 1211. Accordingly, the minor conductive terminal 122 is inserted into the minor insulation core engaging port 1211 and into the minor insulation core engaging port terminal receiving space 12110 to engage the engaging component 3. The minor insulation core terminal positioning structure 1212 is located at the minor insulation core combination body positioning side S2 to position the major conductive terminal 112 entering the major insulation core engaging port terminal receiving space 11110, thereby preventing the major conductive terminal 112 from being disengaged from the major insulation core engaging port terminal receiving space 11110.

It should be noted that the minor insulation core engaging port feature may optionally be a color feature to identify the minor insulation core engaging port 1211 when the multi-piece electrical connector 1 engages the engaging component 3, thereby determining whether the minor insulation core engaging port 1211 has successfully engaged the engaging component 3. However, the present application is not limited thereto. The minor insulation core engaging port feature may alternatively be a structural feature that allows the minor insulation core engaging port 1211 to adapt to the structure of the engaging component 3 so that it can successfully engage the engaging component 3. In addition, the number of minor conductive terminals 122 can be customized and adjusted, and the minor conductive terminals 122 may be signal terminals or power terminals to meet the signal transmission requirements of various electronic devices engaged with the engaging component 3.

In the embodiment shown in FIGS. 5 to 6 and 10 to 11, the minor insulation core terminal positioning structure 1212 may, but is not limited to, be an abutting structure configured to abut the major conductive terminal 112.

In the embodiment shown in FIGS. 5 to 6 and 10 to 11, the multi-piece electrical connector 1 can be combined with a major conductive cable 2 to form a cable-end connector. It should be noted that the minor insulation core 121 further comprises a minor insulation core cable passage structure 1214. The minor insulation core cable passage structure 1214 is configured to guide the major conductive cable 2 into the major insulation core 111 to electrically engage the major conductive terminal 112. The minor insulation core cable passage structure 1214 is disposed apart from the minor insulation core terminal positioning structure 1212 to prevent interference with the insertion of the major conductive cable 2 into the major insulation core 111.

In the above embodiment, the minor electrical connector subcomponent 12 can be combined with the major electrical connector subcomponent 11 such that the minor insulation core combination body 1210 is inserted into the major insulation core combination space 1110, allowing the minor insulation core terminal positioning structure 1212 at the minor insulation core combination body positioning side S2 to position the major conductive terminal 112 and prevent it from being disengaged from the major insulation core engaging port terminal receiving space 11110, thereby improving the service life of the multi-piece electrical connector 1. In addition, after the minor insulation core combination body 1210 is inserted into the major insulation core combination space 1110, the minor insulation core engaging port 1211 is exposed from the major insulation core combination space 1110, allowing the minor insulation core engaging port 1211 and the major insulation core engaging port 1111 to be engaged together to form an electrical connector insulation core engaging port assembly A for engaging the engaging component 3. In this embodiment, the major insulation core engaging port feature and the minor insulation core engaging port feature may optionally be substantially identical or substantially different so that the electrical connector insulation core engaging port assembly A can adapt to the engaging component 3 and allow the minor insulation core engaging port 1211 and the major insulation core engaging port 1111 to successfully engage the engaging component 3.

In the above embodiment, the minor insulation core 121 further comprises a minor insulation core mating structure 1213, which may, but is not limited to, be a latch structure, a fastening structure, or an interference structure. In this way, the minor insulation core mating structure 1213 can be mated with the major insulation core 111 to prevent the minor insulation core 121 from detaching from the major insulation core 111, thereby maintaining the combination relationship between the minor electrical connector subcomponent 12 and the major electrical connector subcomponent 11, and allowing them to be integrated.

In addition, the minor insulation core engaging port 1211 comprises a minor insulation core engaging port foolproof structure 12111, which may, but is not limited to, be a chamfered structure. In this way, the minor insulation core engaging port foolproof structure 12111 can provide foolproof engagement for the minor insulation core engaging port 1211 (or the electrical connector insulation core engaging port assembly A) with the engaging component 3.

Furthermore, the minor insulation core combination body 1210 and the major insulation core combination space 1110 are configured as a complementary convex-concave structure to reduce the size of the combination between the minor electrical connector subcomponent 12 and the major electrical connector subcomponent 11, thereby reducing the size of the multi-piece electrical connector 1 and allowing electronic devices using the multi-piece electrical connector 1 to continue evolving towards being lightweight and compact.

It should be noted that in the embodiments of the present application, some of the aforementioned components may be omitted. For example, a multi-piece electrical connector is provided in the present application, comprising a major electrical connector subcomponent and a minor electrical connector subcomponent. The major electrical connector subcomponent comprises a major insulation core, the major insulation core comprises a major insulation core engaging port, and the major insulation core engaging port comprises a major insulation core engaging port feature. The minor electrical connector subcomponent comprises a minor insulation core, the minor insulation core comprises a minor insulation core engaging port, and the minor insulation core engaging port comprises a minor insulation core engaging port feature; wherein the minor electrical connector subcomponent is configured to be combined with the major electrical connector subcomponent to allow the minor insulation core engaging port and the major insulation core engaging port to be engaged together, and the major insulation core engaging port feature and the minor insulation core engaging port feature are substantially identical or substantially different.

In summary, the present application provides a multi-piece electrical connector, which can be installed in an electronic device to transmit signals. The multi-piece electrical connector is formed by a combination of multiple electrical connector subcomponents, wherein the engaging port features and the number of conductive terminals of the electrical connector subcomponents may optionally be substantially different. Therefore, even after the design of the multi-piece electrical connector is completed, customized adjustment of the engaging structure and the number of conductive terminals can still be achieved by adjusting the combination of the electrical connector subcomponents, thereby enabling the multi-piece electrical connector to be applicable to various electronic devices to meet the specific needs and developments of electronic devices.

The examples above are only illustrative to explain principles and effects of the invention, but not to limit the invention. It will be apparent to those skilled in the art that modifications and variations can be made without departing from the spirit and scope of the invention. Therefore, the protection range of the rights of the invention should be as defined by the appended claims.

What is claimed is:

1. A multi-piece electrical connector comprising:

a major electrical connector subcomponent comprising a major insulation core, the major insulation core comprising a major insulation core engaging port, the major insulation core engaging port comprising a major insulation core engaging port feature; and a minor electrical connector subcomponent comprising a minor insulation core, the minor insulation core comprising a minor insulation core engaging port, the minor insulation core engaging port comprising a minor insulation core engaging port feature; wherein the minor electrical connector subcomponent is configured to be combined with the major electrical connector subcomponent, allowing the minor insulation core engaging port and the major insulation core engaging port to be engaged with each other, wherein the major insulation core engaging port feature and the minor insulation core engaging port feature are substantially identical or substantially different;

wherein the major electrical connector subcomponent further comprises a major conductive terminal inserted into the major insulation core engaging port, and the minor insulation core further comprises a minor insulation core combination body and a minor insulation core terminal positioning structure, the minor insulation core combination body comprising a minor insulation core combination body engaging side and a minor insulation core combination body positioning side, wherein the minor insulation core engaging port is located at the minor insulation core combination body engaging side, and the minor insulation core terminal positioning structure is located at the minor insulation core combination body positioning side to position the major conductive terminal, so as to prevent the major conductive terminal from being disengaged from the major insulation core engaging port.

2. The multi-piece electrical connector of claim 1, wherein the minor insulation core terminal positioning structure is an abutting structure configured to abut the major conductive terminal.

3. The multi-piece electrical connector of claim 1, wherein the major insulation core further comprises a major insulation core terminal positioning structure configured to position the major conductive terminal, so as to prevent the major conductive terminal from being disengaged from the major insulation core engaging port.

4. The multi-piece electrical connector of claim 3, wherein the major insulation core terminal positioning structure is an elastic abutting structure configured to elastically abut the major conductive terminal.

5. The multi-piece electrical connector of claim 1, wherein the minor insulation core engaging port is a hollow cylindrical structure comprising a minor insulation core engaging port terminal receiving space; the minor electrical connector subcomponent further comprises a minor conductive terminal configured to be inserted into the minor insulation core engaging port and received in the minor insulation core engaging port terminal receiving space.

6. The multi-piece electrical connector of claim 5, wherein the major conductive terminal and the minor conductive terminal are signal terminals or power terminals.

7. The multi-piece electrical connector of claim 1, which is configured to be combined with a major conductive cable to form a cable-end connector, wherein the minor insulation core further comprises a minor insulation core cable passage structure configured to guide the major conductive cable into the major insulation core to electrically engage the major conductive terminal, and the minor insulation core cable passage structure is disposed apart from the minor insulation core terminal positioning structure.

8. The multi-piece electrical connector of claim 1, wherein the minor insulation core further comprises a minor insulation core mating structure configured to be mated with the major insulation core to maintain the combination relationship between the minor electrical connector subcomponent and the major electrical connector subcomponent.

9. The multi-piece electrical connector of claim 1, wherein the major insulation core engaging port feature and the minor insulation core engaging port feature are color features or structural features.

10. The multi-piece electrical connector of claim 1, wherein the minor insulation core engaging port comprises a minor insulation core engaging port foolproof structure configured to provide foolproof engagement.

11. The multi-piece electrical connector of claim 10, wherein the minor insulation core engaging port foolproof structure is a chamfered structure.

* * * * *